Figure 1:
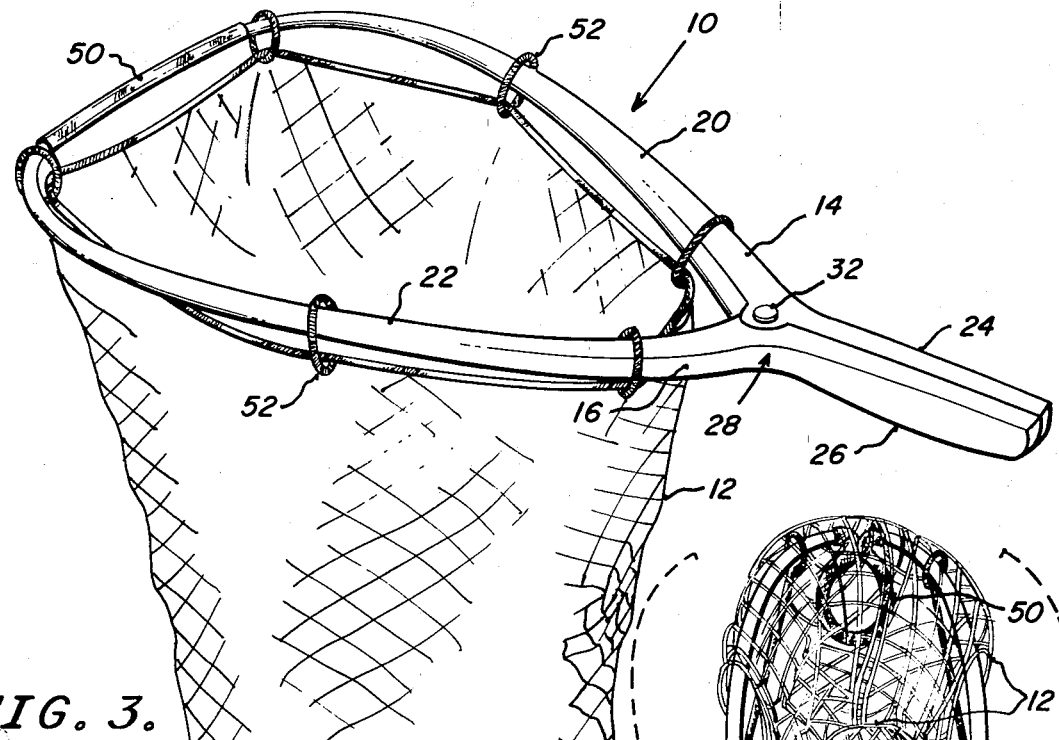

United States Patent [19]
Hamilton

[11] 3,715,829
[45] Feb. 13, 1973

[54] COLLAPSIBLE FISHING NET
[76] Inventor: Charles L. Hamilton, 1315 Maryland Avenue, Golden Valley, Minn. 55427
[22] Filed: Dec. 10, 1970
[21] Appl. No.: 96,947

[52] U.S. Cl. .................................................. 43/12
[51] Int. Cl. ........................................... A01k 77/00
[58] Field of Search .................................. 43/11, 12

[56] References Cited
UNITED STATES PATENTS

| 2,485,781 | 10/1949 | Schreiber et al. | 43/12 |
| 719,862 | 2/1903 | Plumley | 43/12 |
| 2,539,563 | 1/1951 | Baloun | 43/12 |

Primary Examiner—Warner H. Camp
Attorney—Schroeder, Siegfried & Ryan

[57] ABSTRACT

A collapsible fishing net formed of a pair of frame parts having handle and bowed frame portions which are pivotally connected to one another to permit separating and bringing together of the bowed portions with separation and bringing together of the handle portions for the purpose of opening and closing the net frame. A flexible interconnecting member attaches to the free extremities of the curved, bowed portion to complete the net frame and a net is suspended therefrom.

4 Claims, 6 Drawing Figures

PATENTED FEB 13 1973

3,715,829

SHEET 1 OF 2

INVENTOR
Charles L. Hamilton
BY
Schroeder Siegfried & Ryan
ATTORNEYS

PATENTED FEB 13 1973

3,715,829

SHEET 2 OF 2

INVENTOR
Charles L. Hamilton
BY
Schroeder Siegfried & Ryan
ATTORNEYS

COLLAPSIBLE FISHING NET

My invention relates to a fish landing net and more particularly to a collapsible fishing net of an improved type which is readily opened for usage and closed for storage without disassembly of parts.

Fish landing nets in a variety of shapes and forms are well known and in use. Certain of such structures have been made collapsible but these have required disconnecting of parts, release of latches and folding of such structures to change from operative to an inoperative or storage condition. Further, such structures have required the use of both hands of the user in order to manipulate parts in the assembly and disassembly of the same.

The present invention is directed to a simplified collapsible fishing net which may be moved from an operative or open position to a closed or stored position in a minimum of time and with a minimum of effort. This change is effected through the use of a single hand or arm such that it may be used while fishing, thereby leaving the user free to manipulate a fishing rod at the same time. The improved collapsible fishing net of the present invention is opened by moving the handle parts to a closed position and stored by reversing the movement of the handle parts such that change-over may take place through the use of a single hand or arm. This improved fishing net includes a minimum of moving parts and is collapsible in a stored position such that it may be readily carried on the person of an individual or positioned for storage in a boat and readily used merely by manipulating the handles of the same.

It is therefore the principal object of this invention to provide an improved collapsible fishing net.

Another object of this invention is to provide a collapsible fishing net which may be opened and closed in a minimum of time.

A further object of this invention is to provide a simplified structure of this type which is relatively low in cost and easy to use.

Figure 2:
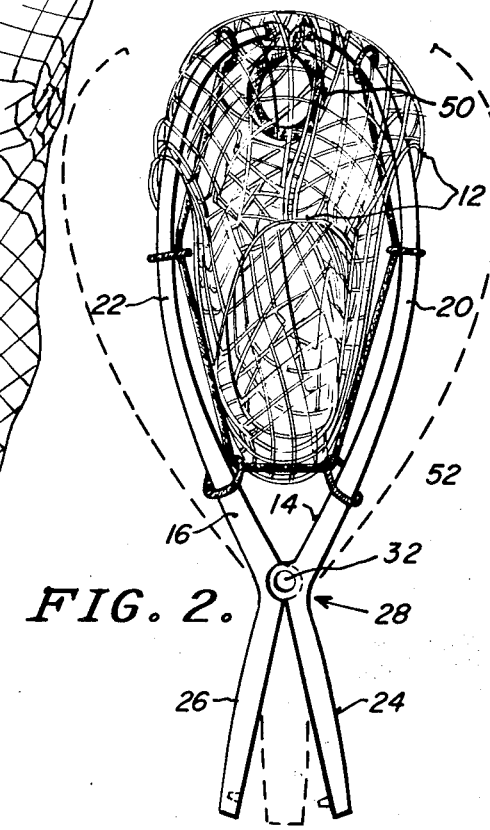
Figure 3:
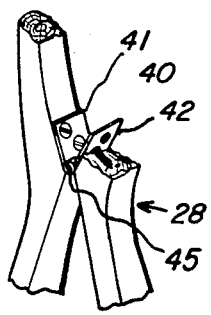
Figure 4:
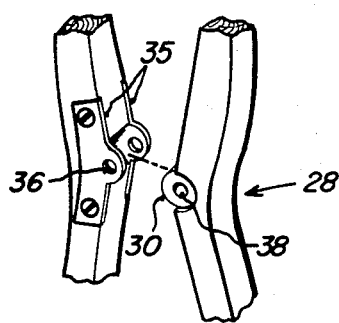
Figures 5, 6:
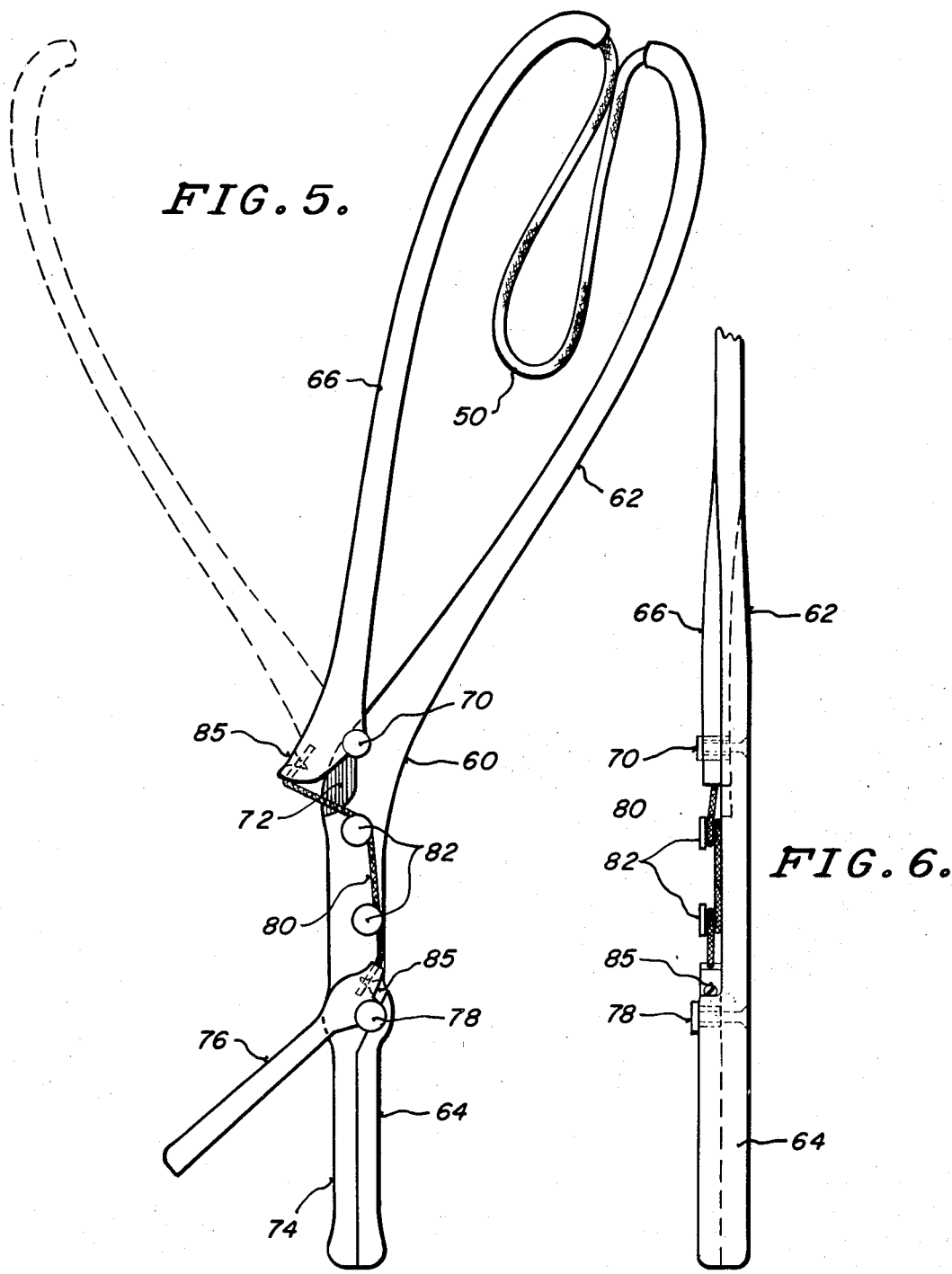

These and other objects of this invention will become apparent from the reading of the attached description together with the drawings wherein:

FIG. 1 is a perspective view of the improved collapsible fishing net in an open or operative position, FIG. 2 is a plan view of the fishing net in a closed condition with parts dotted in phantom to indicate the change and location of the same, FIG. 3 is a perspective view of a portion of a hinge for the collapsible fishing net, FIG. 4 is a perspective view of an alternate embodiment of the hinge for the collapsible fishing net, FIG. 5 is a plan view of an alternate embodiment of the fishing net with parts indicated in phantom to indicate an open position of the same, and FIG. 6 is a side elevation view of the embodiment of FIG. 5 with parts broken away.

As will be seen in FIGs. 1 and 2, my invention in a collapsible fishing or landing net, in its simplest version, employs a simplified frame structure indicated generally at 10 to which a conically shaped net 12 is attached. The frame structure is comprised of a pair of movable frame parts identified at 14 and 16 each having a bowed or curved net carrying portions 20, 22 defining the loop or the open area of the net and with straight handle portions 24, 26 attached thereto and formed integral therewith. This structure may preferably be made of wood or plastic for lightness of weight and strength but can be made of metal if desired. The frame parts 14 and 16 are pivotally connected through a hinge structure, indicated generally at 28, which may take a variety of forms. The hinge structure is located at the junction of the curved or bowed frame parts and the straight handle parts to permit pivoting of the frame parts, as indicated in FIG. 2, between an open and closed position. In FIGS. 1 and 2, the frame part 14 includes an outer bifurcated hinge structure with a recess therebetween while the frame part 16 includes an inner circular grooved tongue portion as indicated in FIG. 4 at 30 fitting therebetween with a suitable pin 32 extending through apertures 36 in the bifurcated portion and circular center portion 30 to pivot the same. Another variety of hinge is shown in FIG. 4 where the bifurcated side portions are not formed integral with the handle or frame part 14 but are rather provided with separate plate member, such as is indicated at 35, with suitable apertures 36 therein aligning with the apertures 38 in the center part 30. An alternate embodiment of the hinge structure is also shown in FIG. 3 where a conventional plate like hinge structure 40 formed of plate parts 41, 42 journaled through a suitable connecting axle or pin 45 are attached respectively to the frame parts along the bowed portions to permit pivoting of the bowed portions toward and away from one another.

The free extremity of the curved or bowed portions of the frame 20, 22 are connected at their extremities by a flexible or deformable member 50 which in the embodiment shown is a piece of tubular plastic positioned over the extremities of the same which plastic will fold or form a circle as the frame parts are collapsed and the handle parts 24, 26 are separated. The extensible member may be made of other suitable material, such as cord, rubber or the like as desired. The net 12 is attached to the frame, defined by the bowed portions and the interconnecting extensible member, at the ends of the same, by means of loops, indicated at 52, or by threading the bowed portion through the open end of the net which will retain the net in an open position with the open extremity of the same connected to the frame. If desired, a suitable spring member may be included in the hinge or positioned between the handle portions to separate the same. However, manual separating of the handles or closing of the same will operate the net between operative positions. The handle parts 24, 26 of the frame or frame members are made of such length relative to the bow portions 20, 22 to provide a single leverage surface sufficient through handgrip and squeezing by the operator or holder to move the handle parts from a separated position to a near abutting position or contacting position with the bow portions moving from a near abutting position to a separated position with a flexible member 50 being drawn taut thereby opening the net. The gripping of the handle parts provide the support for the net.

An alternate embodiment of the net is shown in FIGS. 5 and 6 in which the handle portion is lengthened to increase range of movement of the same. Thus, in FIGS. 5 and 6, one frame part, indicated at 60, includes the bowed, curved frame portion 62 with an extended handle portion 64 formed integral therewith. The opposite frame or side part includes a curved or bowed portion 66 which is pivotally mounted on the frame part 60 near the extremity of the curved portion of the same through a suitable pivot structure 70 which may take any of the forms previously described. In this embodiment, the portions of the frame parts are offset slightly from one another and the frame part 60 is recessed, as at 72, to define a surface upon which the frame part 66 is pivoted. The straight handle portion 64 also includes a recessed section 74 in which the handle part 76 for the bowed portion 66 is mounted. This is pivoted on the handle part 64 through a suitable pivot structure 78 allowing the handle parts to be brought together. A cable 80 connected to the handle portion 76 and extending across guide pulleys or guide members 82 on the handle part 64 attaches to the free extremity of the bowed portion 66 as at 85 to secure the cable thereto. A suitable screw means such as is indicated at 85 in phantom secures the cable therein. Thus, by pivoting the handle part 76 relative to the handle portion 64, the cable is moved to pivot the bowed portion 66 on the pivot structure 70 to separate the bowed portions in the opening of the net. As in the before-mentioned embodiment, a flexible connecting member 50 which may be a tubular plastic or suitable rope material connects to the opposite or free extremities of the bowed portions 62, 66 to define the net enclosure or frame enclosure with the net 12 (not shown) in FIGS. 5 and 6 mounted thereon in a similar manner.

In the use and operation of the improved landing net, a simplified structure is provided which permits frame parts to be moved from an opened to a closed position merely by pressing of the handle parts or bringing them together and separating the same respectively. The net attached thereto is permanently connected and for storage purposes, the closed or conical portion of the net will be flipped over the free extremity of the frame defined by the bowed parts 20, 22 and the connecting portion 50 to bring the bottom of the net over into the open area of the net. By separating the handles, the net moves from an opened to a closed position defining a compact structure which may be carried in a sheath or readily mounted in a clamp on the side of a boat to significantly reduce the size of the same but provide a net which is readily opened for usage in a minimum of time. To open the net the reverse of the procedure takes place with the closed extremity of the net being swung clear of its position where it was wrapped around the end portion thereof and the handles of the frame parts pressed together to separate the bowed portions and define the net opening. The alternate embodiment shown in FIGS. 5 and 6 operates in a similar manner and the handle portions 76 are merely displaced from integral connection with its frame part 66 and pivoted on the frame part 64 to facilitate spacing of the same along the extent of the straight handle portion such that a greater range of movement with the net is provided. The handle is connected through a cable system which permits relative pivoting of the frame parts 62, 66 to open and close the net in the same manner. Suitable tensioning springs biasing the net to a closed portion may be provided. Such structure is not necessary in that mechanical moving of the handle portions effects the opening and closing movement and clamping the handles together with one's hand permits operation of the net with a single hand allowing the fisherman the opposite hand or arm free to manipulate a fishing rod or associated equipment.

This simplified structure may utilize a variety of materials and hinge structures as indicated in the drawings. The overall design provides a simplified collapsible net which may be readily moved from a stored to an operative position without connection or disconnection parts.

In considering this invention it should be remembered that the present disclosure is illustrative only and the scope of the invention should be determined by the appended claims.

What is claimed is:

1. A collapsible fishing net comprising, a pair of frame members each of said frame members having a curved bow portion and a straight handle portion associated therewith, at least one of said handle portions being formed integral with a bow portion, hinge means connecting said frame members together at one end of each of the curved bow portions for pivotal movement about an axis normal to the extent of the frame members, said hinge means being formed in part in each of said frame members, a flexible connection means secured to said frame members and extending from the other end of each of said curved bow portion of the frame members to define an enclosure therebetween, and a conically shaped net connected at its open extremity to the bow portions of the frame members and to the flexible connection member positioned therebetween, said handle portions being of such length relative to the bow portions of the frame members to provide sufficient leverage surface to move the handle portions from a separated position to a near abutting position while said bow portions move from a near abutting position to a separated position by pivoting the bow portions on the hinge means with said flexible connection taut and said net open with the handle portions providing the sole supporting handgrip surface for said net to support said net and hold said net in the open position.

2. A collapsible fishing net comprising, a pair of frame each of said frame members having a curved bow portion and a straight handle portion associated therewith, at least one of said handle portions being formed integral with a bow portion, hinge means connecting said frame members together for pivotal movement, said hinge means being attached at one extremity of the bow portions of said frame members, a flexible connection means connected to the other extremity of each of said bow portion of the frame members and defining an enclosure therebetween, and a conically shaped net connected at its open extremity to the bow portions of the frame members and to the flexible connection member positioned therebetween, said bow portions of the frame members pivoting on said hinge means such that the other extremity of the bow portions are positioned in near abutting relationship and with the flexible connection means collapsed when said handle portions are separated from one another, said handle portion of one of the frame members being connected to the bowed curved portion thereof through a motion transmitting means.

3. The collapsible fishing net of claim 2 in which the motion transmitting means is a cable connected to the bowed curved portion of said one of said frame members and the straight handle portion thereof with the straight handle portion being pivotally mounted on the other of the straight handle portions and the cables connected over pivot means mounted on said other of said straight handle portions.

4. The collapsible fishing net of claim 2 in which the closed extremity of said conically shaped net is adapted to fold over the flexible connection means and be stored between the bowed curved portions of the frame members when the handle portions are separated and the fishing net is stored.

* * * * *